United States Patent Office 3,129,965
Patented Apr. 21, 1964

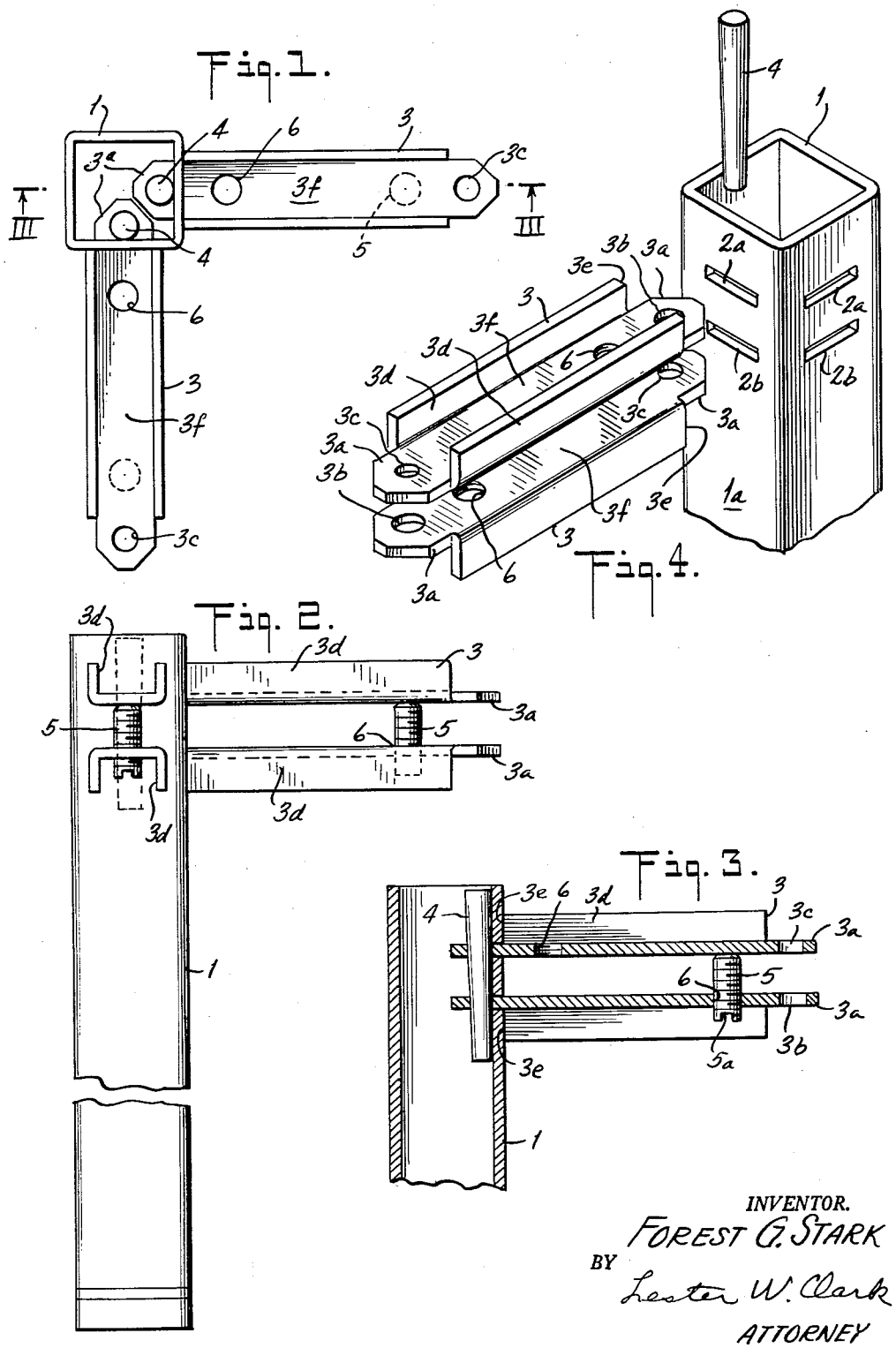
INVENTOR.
FOREST G. STARK
BY Lester W. Clark
ATTORNEY

3,129,965
CONNECTOR
Forest G. Stark, Jamestown, N.Y., assignor to Art Metal, Inc., Jamestown, N.Y., a corporation of New York
Filed Sept. 22, 1960, Ser. No. 57,769
3 Claims. (Cl. 287—54)

This invention relates to connectors. More particularly, this invention relates to connectors or connector assemblies particularly useful in the manufacture and/or assembly of metal furniture, such as metal office furniture, cabinets, tables and the like.

It is an object of this invention to provide a simple, rugged, strong connector.

It is another object of this invention to provide a readily assembled connector assembly.

Still another object of this invention is to provide a leg to stretcher connector useful in metal cabinet construction and in the manufacture and assembly of metal furniture and the like.

Still another object of this invention is to provide a connector assembly useful for fastening or attaching horizontal stretchers or bars or rung-like members to vertical leg support members.

Yet another object of this invention is to provide a versatile leg to stretcher connector particularly useful in furniture and office equipment construction and the like.

How these and other objects of this invention are achieved will become apparent in the light of the accompanying disclosure made with reference to the accompanying drawings which illustrate one embodiment of the practice of this invention and wherein:

FIG. 1 is a plan view of a connector assembly in accordance with this invention;

FIG. 2 is a side elevational view of the assembly of FIG. 1;

FIG. 3 is a cross sectional view of the connector assembly taken along line III—III of FIG. 1; and FIG. 4 is an exploded view of the connector assembly of this invention showing the principal component parts thereof.

In accordance with this invention means are provided for substantially rigidly fastening or attaching connector members or a connector assembly to a support member such as a leg support member by providing a hollow support member and then inserting through suitable openings in said hollow support member rigid connector members, such as steel channel members, provided with end tab portions and fastening said connector members to said support members by means of a fastening member disposed within the hollow portion of said support member and fitted within openings provided through tab portions of the connector members inserted through said openings into the hollow portion of said support member.

Referring now in detail to the drawings which illustrate one embodiment of this invention, a hollow leg support member having a square cross section is indicated by reference numeral 1. Hollow support member 1 is provided with slots or openings 2a and 2b therethrough on one or more faces or sides of support member 1. Slots 2a and 2b are of the same size and are positioned directly one above the other on one or more sides of the support member 1.

In the assembly of the connector assembly of this invention connecting members or channel members 3 provided with end tab portions 3a are inserted within slots 2a and 2b, the tab portions 3a snugly fitting within slots 2a and 2b and extending into the interior of support member 1. The tab portions 3a of each channel member 3 are provided with openings therethrough, one for each tab portion, one opening 3b through one tab portion 3a of channel member 3 being larger in diameter than the other opening 3c through the other tab portion 3a of the same channel member 3.

In the assembly of the connector assembly to leg support member 1 the tab portion 3a having the larger diameter opening 3b therethrough is inserted into upper slot 2a, the respective upper channel member 3 being positioned such that the side flanges 3d thereof extend upwardly. The upper channel member 3 is fitted into slot 2a such that the tab portion 3a thereof extends substantially completely within the interior of leg support member 1 and the end surfaces 3e of flange portions 3d abut flush against the outside surface or wall, such as wall 1a, of support member 1.

The other, lower channel member 3 is inserted within lower slot 2b such that its tab portion 3a also extends substantially completely within support leg 1 and the end surfaces 3e of flange portions 3d of the lower channel member also abut flush against surface 1a of support member 1. As illustrated, however, the lower channel member 3 is inserted by means of its tab portion 3a having the smaller diameter hole 3c therethrough such that the flange portions 3d thereof extend downwardly from the web portion 3f with the result that the upper and lower channel members 3 are arranged with respect to each other such that the web portions 3f of each are disposed adjacent and vertically spaced from each other.

When the channel members 3 are thus inserted within slots 2a and 2b of support member 1, taper pin 4, small diameter end first, is inserted into the interior of support member 1 into openings 3b and 3c of the tab portions 3a extending within support member 1. A driving fit of taper pin 4 within holes 3b and 3c of tab portions 3a within support member 1 is then effected thereby effectively substantially rigidly fastening channel members 3 together and to support member 1. Thereupon, set screw 5 is threadedly engaged within tapped hole 6 located along the longitudinal axis of web 3f of channel member 3 such that the center of tapped hole 6 is not equidistant, as illustrated, from the ends of channel member 3. Set screw 5 is provided with a slot 5a on its head so that by means of a suitable tool, such as a screw driver, set screw 5 can be threaded and turned within hole 6 so that the end of set screw 5 abuts against the opposing adjacent web portion 3f of upper channel member 3 thereby serving to spring or force the channel members 3 somewhat apart from each other and further tending to more rigidly fasten channel members 3 to support leg 1. Also by means of the above indicated adjustment between channel members 3 afforded by set screw 5 a snug fit between the fastened channel members 3 and a stretcher bar or rung inserted thereon can be afforded.

By following the above-indicated operations one or more connector assemblies, as illustrated in FIG. 1 of the drawings, can be provided on a single support member. Further, as indicated in the drawings, by means of a relatively small number of parts, support member 1, channel member 3, pin 4 and set screw 5, a very versatile, simple, rugged and strong connector assembly can be obtained, channel members 3 being duplicates and cooperating when one channel member is turned and placed in reversed position with respect to the other channel member so as to cooperate to yield a simple, effective and rigid connector assembly in association with a support member.

As illustrated in the drawings, one or more connector assemblies may be fastened to a single support member. For sake of simplicity a hollow support member having a square cross section has been illustrated. It is pointed out, however, that a hollow support member may have any desirable or suitable shape, such as triangular, pentagonal, hexagonal, octagonal, etc. in cross section, or circular in cross section. It is further seen that substantially any number of connector assemblies may be fastened to a support member, laterally and/or vertically depending upon the size of the channel members and the size of the support member.

As will be apparent to those skilled in the art in the light of the foregoing disclosure, many changes, alterations or substitutions are possible in the practice of this invention without departing from the spirit or scope thereof.

I claim:

1. A connector assembly comprising a hollow support member provided with two vertically spaced, horizontally disposed slots communicating with the interior of said support member, one of said slots being directly above the other of said slots, separate, independent channel members each provided with a tab portion extending from the web portion of said channel member on either end thereof fitted into said slots such that an end tab portion of said separate channel members extends through one of said slots into the interior of said support member so that the end surfaces of the flange portions of said channel members abut against the outside surface of said support member, the tab portions of said channel members being inserted into the slots of said support member, one above the other, such that the upper channel member is positioned with its flange portions upwardly directed and the bottom channel member with its flange portions downwardly directed and a tapered pin located within the interior of said hollow support member and inserted through holes provided in the tab portions of said upper and lower channel members.

2. A connector assembly comprising a hollow support member provided with two vertically spaced, horizontally disposed slots therethrough, one of said slots being directly above the other of said slots, separate, independent channel members each provided with a tab portion extending from the web portion of said channel member on either end thereof fitted into said slots such that an end tab portion of each of said channel members extends through one of said slots into the interior of said support member so that the end surfaces of the flange portions of said channel members abut against the outside surface of said support member, the tab portions of said channel members being inserted into the slots of said support member, one above the other, such that the upper channel member is positioned with its flange portions upwardly directed and the lower channel member with its flange portions downwardly directed, a tapered pin inserted within said hollow support member and through holes provided in the tab portions of said upper and lower channel members and a set screw threadedly engaged in an opening provided in the web portion of the lower channel member and adjusted to bear against the opposed adjacent surface of the web portion of the upper channel member.

3. A connector assembly in accordance with claim 2 wherein the hole provided in the tab portion of the upper channel member inserted into said support member is larger than the hole provided in the tab portion of the lower channel member inserted into said support member.

References Cited in the file of this patent

UNITED STATES PATENTS

| | | |
|---|---|---|
| 1,021,185 | Foster | Mar. 26, 1912 |
| 1,118,979 | Weiss | Dec. 1, 1914 |
| 1,124,156 | Lough | Jan. 5, 1915 |
| 1,506,442 | O'Hara | Aug. 26, 1924 |
| 2,172,266 | Whitaker | Sept. 5, 1939 |
| 2,744,795 | McDonough | May 8, 1956 |